United States Patent
Hicks

[15] 3,677,516
[45] July 18, 1972

[54] FAUCET
[72] Inventor: Glenn W. Hicks, 2749 North 75th St., Milwaukee, Wis. 53210
[22] Filed: March 16, 1970
[21] Appl. No.: 11,748

[52] U.S. Cl..............................251/174, 251/185, 251/208, 251/304
[51] Int. Cl.........................................F16k 3/08, F16k 3/10
[58] Field of Search..................251/208, 174, 185, 304, 214

[56] References Cited

UNITED STATES PATENTS

| | | | |
|---|---|---|---|
| 3,009,679 | 11/1961 | Williams | 251/174 X |
| 1,172,464 | 2/1916 | Kellum | 251/287 |
| 2,976,009 | 3/1961 | Hartmann | 251/214 X |
| 3,292,898 | 12/1966 | Willman | 251/214 X |

FOREIGN PATENTS OR APPLICATIONS

| | | | |
|---|---|---|---|
| 577,430 | 6/1924 | France | 251/304 |

*Primary Examiner*—Arnold Rosenthal
*Attorney*—James A. Hauer

[57] ABSTRACT

A faucet of the type for controlling the flow of fluids therethrough in which the rotational action of the faucet valve stem within the body of a faucet, together with limiting control of axial displacement of the valve stem, provides for control of fluid through the faucet, and wherein effective seal means between the valve stem and other fixed portions of the faucet are simplified and essentially free from wear, thereby eliminating the normal compression and wearing problems inherent in faucet construction.

10 Claims, 4 Drawing Figures

Patented July 18, 1972
3,677,516
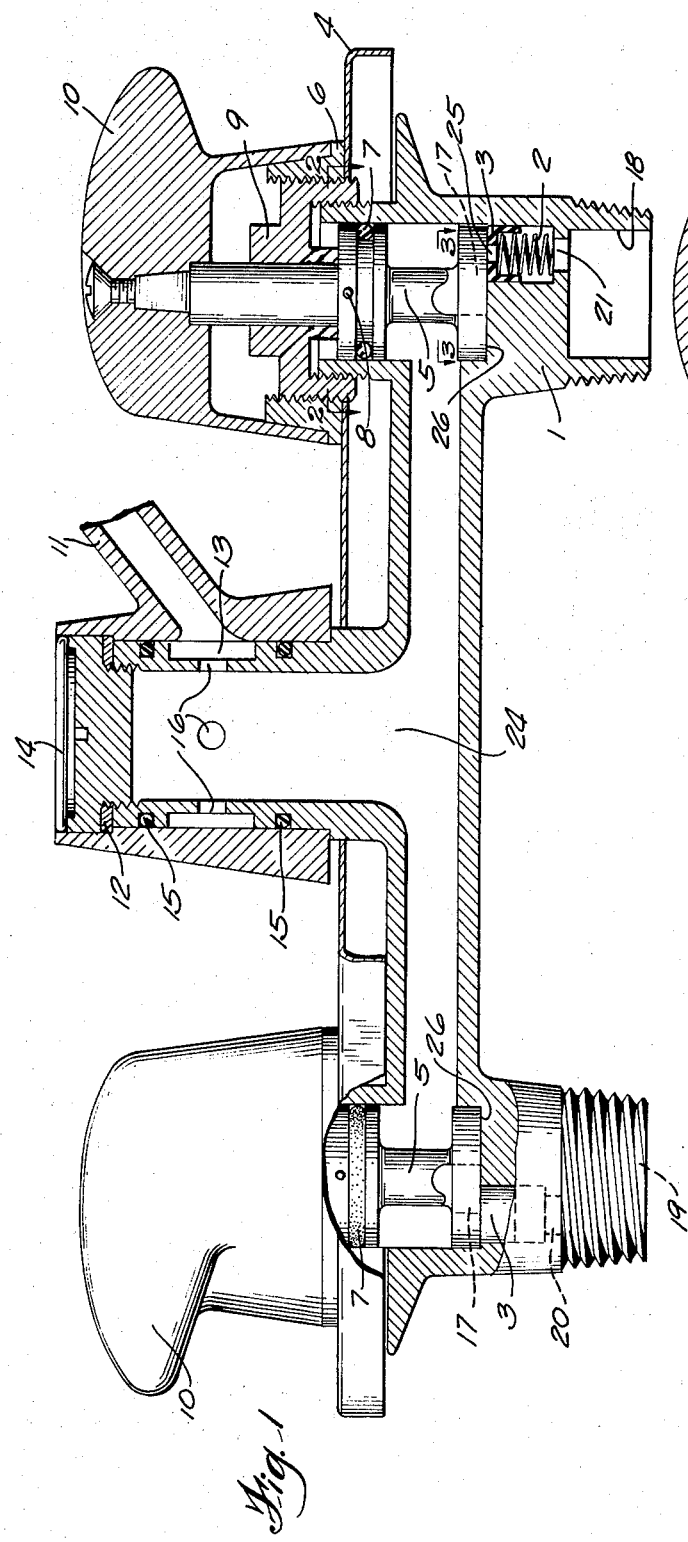
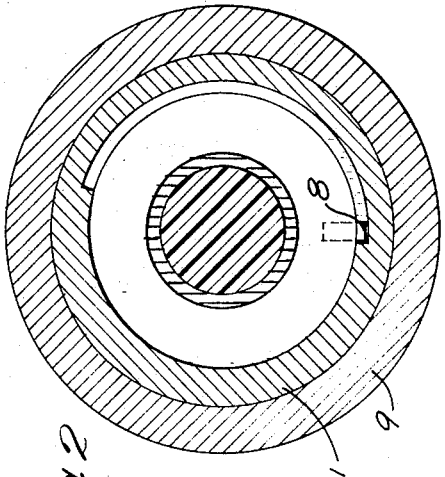
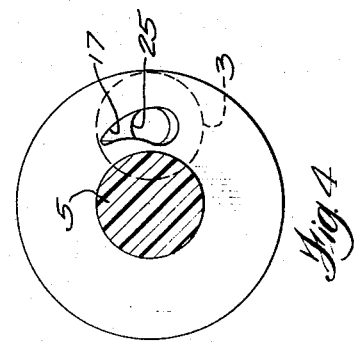
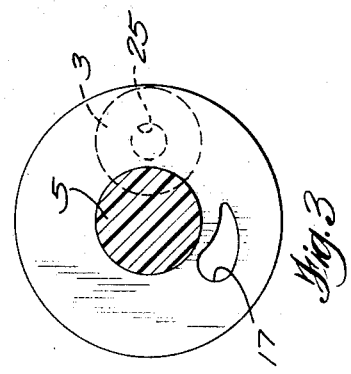
Inventor
Glenn W. Hicks
By James Hauer
Attorney

FAUCET

BACKGROUND OF INVENTION

The existing prior art discloses an extreme variety of faucets, many of which through the past years have performed acceptably, and in spite of limitations, continue to be manufactured in large volume and sold for the normal use requirements. The market for faucets obviously is in the millions of units each year. The need for specific designs and quality varies with the type of liquid flowing through the faucet, the temperature of the fluid, volumes needed, pressure sustained within the fluid flow, etc. An example of the type of faucet relating to current designs is disclosed in the patent issued to G. W. Hicks as U.S. Pat. No. 3,511,277. Various other patents are referred to in that application. Among the several disadvantages with the presently manufactured faucets are the problems of maintenance, both in cost and in time wasted, as well as complicated procedures sometimes necessary in repair of even a minor nature, exceptionally high sound problems from the flow of water through the faucet, vibrations within the faucet caused by fluid flow, etc. Designs with these inherent disadvantages continue to be manufactured and sold and used in large numbers.

The necessity for providing for simple manufacture, economical assembly, and relatively inexpensive repair is obvious.

SUMMARY OF THE INVENTION

The inventive concept of the present invention resides in providing an opening and closing mechanism which facilitates controlled volume flow, unaffected by pressure of the fluid, and further permitting fluids of varying temperatures to be used without affecting the control feature of the faucet. The concept disclosed comprises a flat or otherwise smooth surface portion of the stem body having an arcuate elongated designed aperture slidably and smoothly engaging a resilient cylindrical seal member which is seated in the body portion of the faucet housing. The seal member having an opening for flow of fluid, through manual or other means becomes aligned with the elongated aperture in the stem body in a manner to permit varying degrees of overlay and thus fluid flow through the opening and closing mechanism. The simplicity of the sealing mechanism construction is essentially the difference in the present invention's ability to overcome the many disadvantages of other presently manufactured faucets. The obvious simplicity of the invention eliminates the need for changing washers, worn out screws, seating problems, and for all intent and purpose eliminates repair and maintenance problems inherent in present faucet designs.

DESCRIPTION OF THE DRAWINGS

FIG. 1 is a cross-sectional (partial) side view of the faucet as used in a two handle faucet;

FIG. 2 is a cross-sectional plan view taken on line 2—2 of FIG. 1;

FIG. 3 is a cross-sectional plan view taken on line 3—3 of FIG. 1;

FIG. 4 is a cross-sectional plan view taken on line 3—3 of FIG. 1, with the stem rotated for alignment of the elongated opening and the opening in the cup washer seal.

Referring to the drawings in detail, the faucet housing or body 1 has at either end similar faucet mechanism of the type comprising this invention. Cold or hot water inlet ports 18 and 19 are normally connected to the water supply lines. A port 18 and 19 in each of the faucets may provide for a screw connection or a welded connection to the water supply. Within the housing 1 are apertures 20 and 21 extending through and opening into the mixing area 24 of the body 1. Each faucet has a stem body 5 made of plastic or metal and is within the faucet housing 1 in contact with a cup washer seal 3 for rotatable motion therein. The bottom surface portion 26 of each of the stems 5 seats in a very close relationship with the body 1. The elongated aperture 17 in each of the stem body portions 5 may be brought into alignment with the apertures 20 and 21 within the faucet housing body 1.

A cup washer seal 3 is continuously spring urged by spring 2 to urgingly seal the flow of fluid flowing through the inlets 18 and 19 and confine their flow only through the opening 25 in the cup washer seal 3. The elongated aperture or opening 17 in each of the valve stem bodies is so located with respect to the center of rotation of the valve that the action permitting alignment as shown between FIG. 3 and FIG. 4 results in going from the closed relationship in FIG. 3 to an almost completely open faucet in FIG. 4.

The cup washer seal spring 2 should be of a corrosive resistant material such as stainless steel and have a rather nominal pressure capacity. The valve stem body 5 is held in by the rotating stop pin 8 which seats in the groove formed in the faucet body, as best shown in FIG. 2. Thus the valve stem 5 is permitted to rotate, but cannot move vertically from its position, except as permitted by the resiliency of the cup washer seal at the bottom of the stem 5. O-ring 7 serves to seal and prevent fluid from flowing up through the handle portion of the faucet.

Stop 8 adjusts the degree of rotation as in any presently used faucet.

A casting cover 4 is the standard cover for such a two handled faucet. After this is put in place the adjusting nut 6 adjusts the proper seating of the faucet and stem cover nut 9 is screwed on to adjust the stem 5 to its proper seating within the faucet body 1.

A standard handle 10 is provided for each faucet. A screw or normal attachment means is provided to secure the handle for easy removal or assembly.

In the present embodiment of the invention, the cold water would enter through inlet port 19 and the cold water then goes through port 20 into the body 24 of the faucet to mix with hot water which would flow through inlet port 18. Once mixed the fluid flows out apertures 16 and into the mixing spout 11. O-rings 15 provide an adequate seal for the rotatable mixing spout 11. The cap washer 12 becomes secured by the cap seal screw and then the cap 14. At point 13 within the mixing spout 11 the mixed fluid prepares to exit at its median temperature.

The construction of the device is such that water or fluid entering inlet ports 18 or 19 passes through the apertures 20 and 21, through the opening 25 in the cup washer seal 2 only when the opening 25 is in any part of alignment with the stem opening 17; otherwise the cup washer seal 2 performs its function of providing a complete and perfect seal.

As indicated, the faucet stem 5 may be of a molded plastic which is suitable for use with fluids having variable heat. "Delrin," a easily moldable material becomes readily suitable for making several of the parts. Likewise, the cup washer 3 fits readily the use of a plastic material.

With pressure on the fluid flowing or able to flow into the ports 18 and 19, turning of the handle 10 to provide for movement of the faucet stem 5 from its position as shown in FIG. 3, a closed position, to that of FIG. 4, an almost completely open position, indicates the ability to provide for opening flow of fluid from a small flow, the small end of the elongated aperture 17 first aligning with the opening 25, and the large end of the tear drop opening 17 then becoming substantially aligned with opening 25 for the largest rate of flow. As thus shown, the flow will be small if the valve stem 5 is moved to provide only minimal overlay between the openings and maximum flow when the openings 25 and 17 are in full alignment.

The cup washer seal 3, spring urged by spring 2 against the surface 26 of the stem body 25 provides essentially the only seal between the two parts, and together with the O-ring 7 prevents a leak of any type within the faucet during flow of fluid or when the handle is in its closed position.

The valve stem 5 merely rotates, does not at any time provide for vertical or axial motion, and provides an inexpensive though rather indestructible closure for almost all types of fluids requiring a faucet mechanism.

The stem cover nut 9 could be shown to seat and positively hold the stem body 5 in its final position by having a portion of the nut 9 extended to become juxtaposed with the upper surface of the stem body 5 portion adjacent the O-ring 7. This would provide for a very positive positioning of the stem body 5 when the stem cover nut 9 is tightened to its proper position.

The valve stem 5 consisting of but one piece may be replaced or exchanged without any experience; corrosion through fluid reaction or electrolysis is eliminated with the use of plastic and the faucet can be operated by a one-quarter turn of the handle to provide going from a closed to a completely open position.

This construction permits using the same design faucet and internal parts for the sink in the bathroom as well as the faucet for the shower. Likewise use of this device for outside faucets provides easily repaired new stem should strong use of the handle break or strip the handle seating on the faucet stem.

Water or fluid pressure flowing through the faucet assists the sealing of the cup washer seal 3 in that the pressure of the fluid prevents flow of any fluid between the outside wall of the cup washer seal and the cylinder wall of the port 21 and 20 within which the cup washer seal 3 is seated.

Although but a single embodiment of the present invention has been illustrated and described, it will be apparent to those skilled in the art that various changes and modifications may be made therein without departing from the spirit of the invention or from the scope of the appended claims.

I claim:

1. A faucet to control the volume flow of fluid, comprising:
   a housing having a cylindrical hollow chamber therein and having an inlet port and an outlet port to said chamber, and having a restricting aperture of a size substantially less in diameter than the inlet port connecting the inlet port with the hollow chamber,
   a stem member rotatably disposed within the housing and being concentric with said inlet port and said hollow cylindrical chamber and having a body portion of substantially the same diameter as the cylindrical chamber and further having an opening in the body portion intermediate of the restricted aperture portion of the inlet port and the outlet port of the housing chamber, resilient seal means in the restricted aperture portion housing yieldingly and continuously urged and juxtaposed with the body portion of the stem member and forming the seal for the inlet port to the chamber, said restricted aperture having the seal means therein axially parallel to but nonconcentric with the inlet port and said seal means further having an opening therein for fluid transfer therethrough, rotational movement of the stem resulting in movement and positioning of the opening in the body portion of the stem with respect to the opening in the seal means permitting alignment of the opening in the seal means with the stem opening, from a closed relationship to an aligned and completely open relationship and thereby permitting variation in the rate of flow of fluid through the faucet a closure member concentric with the cylindrical hollow chamber and with the inlet port for retaining the stem member, and an O-ring between the stem member and hollow housing providing sealing means for preventing fluid pressure directly on the closure member.

2. A faucet according to claim 1 wherein the closure member is provided to restrict upward axial movement of the stem member, thereby limiting the stem member substantially to rotational movement.

3. A faucet according to claim 1 wherein the opening of arcuately increasing size in the body portion of the stem member is an elongated arcuate opening.

4. A faucet according to claim 1 wherein said stem member forms a portion of a rotatable assembly and said housing form a part of a fixed assembly and stop means are provided between said assemblies to limit relative rotation therebetween to the closed and fully opened relationship.

5. A faucet to control the volume flow of fluid, comprising:
   a hollow housing having a first opening therein for fluid admittance, and having a second opening therein substantially 90° of the first opening and providing for fluid exiting therethrough, a stem for the faucet within the housing rotatably mounted and having an opening of arcuately increasing size through the flat bottom surface whereby the stem rotation permits movement of the opening from a closed relationship with the first opening in the housing to successive degrees of opening and alignment with the first opening in the housing, said stem having a second circular body portion of substantially the same size coaxial with and spaced above said first portion to define a fluid receiving space therebetween, said space being in communication with the second opening, and seal means above said second body portion interposed between the stem and the housing wherein said seal means prevents leaking of fluid from the faucet when in a closed position or in an open position and is provided by two seal means, a first being an O-ring sealing the position between the stem and the inside wall of the metal housing and the second being a resilient seal hollow cup member seated and sealing itself within the first opening in the metal housing, said resilient seal hollow cup member having an opening therethrough permitting of fluid flow therethrough.

6. A faucet according to claim 5 wherein resilient seal means is provided between the flat bottom surface of the faucet stem and the fluid admittance opening in the metal housing.

7. A faucet to control the volume flow of fluid, comprising:
   a housing having a cylindrical hollow chamber therein and having an inlet port and an outlet port to said chamber and having an aperture axially parallel to but non-concentric with the hollow chamber and connecting the inlet port with the hollow chamber, a stem member rotatably disposed in said hollow cylindrical chamber and having a first circular body portion of substantially the same diameter as the cylindrical chamber and an opening in the first body portion intermediate of the aperture and the outlet port, resilient seal means in the aperture yieldingly and continuously urged and juxtaposed with the first body portion of the stem member and forming the seal for the inlet port to the chamber, said aperture having the seal means therein, said seal means further having an opening therein for fluid transfer therethrough, rotational movement of the stem resulting in movement and positioning of the opening in the first body of the stem with respect to the opening in the seal means permitting alignment of the opening in the seal means with the stem opening, from a closed relationship to an aligned and completely open relationship, said stem having a second circular body portion of substantially the same size coaxial with and spaced above said first portion to define a fluid receiving space therebetween, said space being in communication with the inlet port, a closure member concentric with the cylindrical hollow chamber for retaining the stem member, and O-ring seal means between said second body portion and said closure member positioned to seal against said second body portion and said chamber to prevent fluid pressure from bearing directly on said closure member.

8. A faucet according to claim 7 wherein said stem member forms a portion of a rotatable assembly and said housing form a part of a fixed assembly and stop means are provided between said assemblies to limit relative rotation therebetween to the closed and fully opened relationship.

9. A faucet to control the volume flow of fluid, comprising:
   a hollow housing have a first opening therein for fluid admittance, and having a second opening therein substantially 90° of the first opening and providing for fluid exiting therethrough, a stem for the faucet within the housing rotatably mounted and having a first circular body portion with a smooth flat bottom surface and an opening of arcuately increasing size through the flat bottom surface whereby the stem rotation permits movement of the opening from a closed relationship with the first opening in the housing to successive degrees of opening and alignment with the first opening in the housing, said stem having a second circular body portion of substantially the same size coaxial with and spaced above said first portion to define a fluid receiving space therebetween, said space being in communication with the second opening, and seal means above said second body portion interposed between the stem and the body, and wherein said stem member forms a portion of a rotatable assembly and said housing forms a part of a fixed assembly and stop means are provided between said assemblies to limit relative rotation therebetween to the closed and fully opened relationship.

10. A faucet according to claim 9, wherein resilient seal means is provided between the flat bottom surface of the faucet stem and the fluid admittance opening in the housing.

* * * * *

UNITED STATES PATENT OFFICE
CERTIFICATE OF CORRECTION

Patent No. 3,677,516　　　　　　　　Dated July 18, 1972

Inventor(s) Glenn W. Hicks

It is certified that error appears in the above-identified patent and that said Letters Patent are hereby corrected as shown below:

At column 5, line 10, "body" has been cancelled and

---housing--- has been substituted therefor.

Signed and sealed this 18th day of February 1975.

(SEAL)
Attest:

RUTH C. MASON
Attesting Officer

C. MARSHALL DANN
Commissioner of Patents
and Trademarks